Patented July 23, 1935

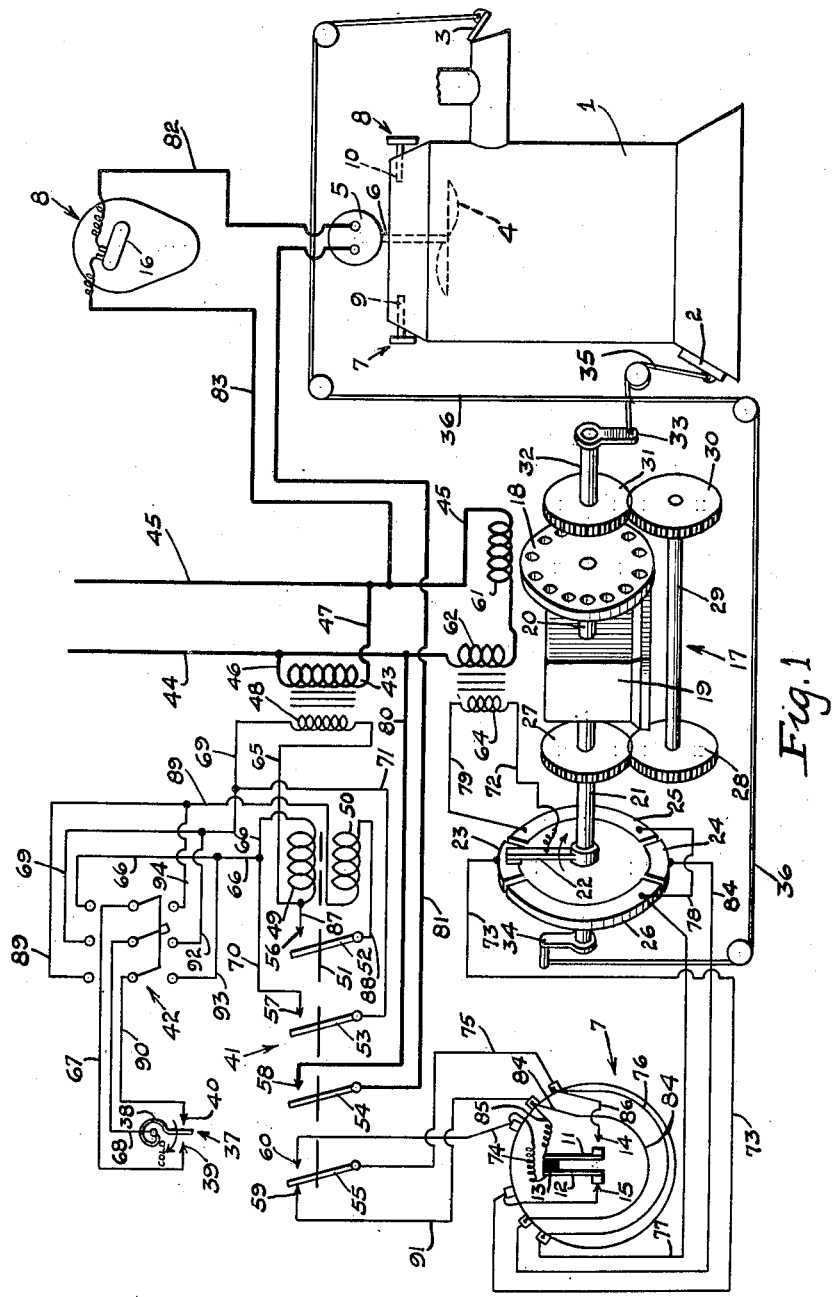

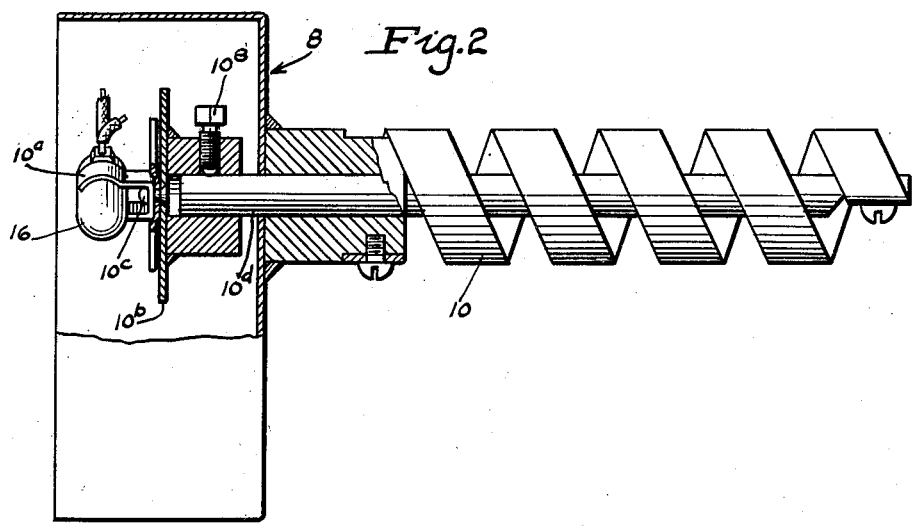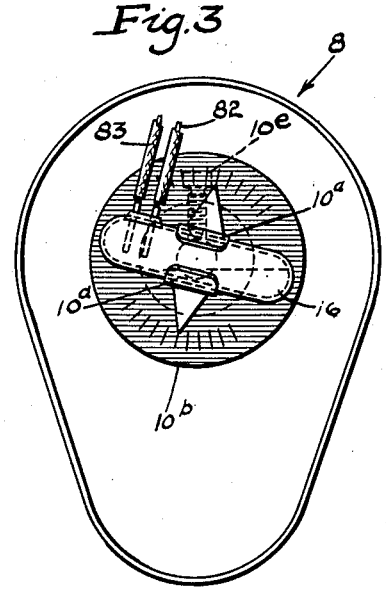

2,008,776

UNITED STATES PATENT OFFICE 2,008,776

CONTROL SYSTEM FOR CIRCULATION IN HOT AIR FURNACES

Daniel G. Taylor, Minneapolis, Minn., assignor to Minneapolis-Honeywell Regulator Company, Minneapolis, Minn., a corporation of Delaware Application March 24, 1932, Serial No. 600,955

18 Claims. (Cl. 236—11)

This invention relates generally to improvements in systems for controlling hot air furnaces, and particularly to means for producing and controlling forced circulation in the air delivery line or lines of the furnace, to obtain maximum efficiency. Among the objects are: to control a circulation fan or other forced-circulation-producing means in relation to the amount of heat output of the furnace, and cooperatively with means for varying the rate of combustion in the furnace; to use a room thermostat for cooperatively controlling both the circulation-forcing means and the combustion rate-varying means; to utilize the room thermostat for selectively controlling those means; to provide means by which the action phase of the thermostat can be changed to obtain operation of the fan conformably to room temperature in the summer time as means for cooling the room by forcing draft in the pipe lines of the furnace; to utilize a relay for controlling the circulation-forcing means and combustion rate-varying means by means of a room thermostat; and generally to provide a device automatically controllable by a single room thermostat, for winter and summer operation.

Features of the invention include the use of a single room thermostat for controlling the furnace draft fan both for summer and winter use; the idea of using means for reversing the action phase of the room thermostat; the use of the thermostat and its reversing means in conjunction with a relay for controlling the heat to the furnace, and for controlling the fan; the use of a room thermostat and means for reversing its action phase in conjunction with high and low limit thermostatic devices; and the use of a room thermostat with means for reversing its action phase, in conjunction with any means by which furnace drafts or fuel can be controlled in some predetermined cooperative relation to a draft fan.

Objects, features and advantages of the invention will be set forth in the description of the drawings forming a part of this application, and in said drawings Figure 1 is a diagrammatic view illustrating the system in its entirety;

Figure 2 is a vertical longitudinal section through the thermostatic switch which controls the circuit of the fan motor; and Figure 3 is a front elevation of the structure of Figure 2.

Referring to Figure 1: A hot-air furnace is indicated at 1, and has dampers 2—3 which are symbolic of means for varying the rate of combustion. It is understood that this means can be replaced by a gas valve or any other fuel feeding or furnace-controlling device, depending upon the type of fuel which it is desired to be burned, and may be considered to be a mechanical stoker.

A fan or equivalent means 4 is arranged within the furnace to force circulation of air in the delivery pipe or pipes to the room. This fan is operated by a motor 5 through shaft 6.

Arranged, in this instance, in the bonnet are two thermostatically controlled switching devices respectively generally designated 7—8, responsive to temperature conditions at the furnace. These switches are also diagrammatically illustrated in the same figure, and switch 8 is illustrated in more detail in Figures 2 and 3. The thermostatic elements of the switches are respectively indicated at 9—10 and these elements extend into the furnace casing. The function of switch 7 is to reduce the rate of combustion when furnace temperature becomes too great and may be called a high limit switch or limit control. Referring in more detail to this switch, shown at the lower left-hand side of Figure 1, a pair of switch arms, respectively designated 11—12, are insulated from one another by a block 13 controlled by thermostatic bi-metallic element 9. The arms 11—12 respectively cooperate with contacts 14—15. Suitable means, not shown, is usually provided for adjustably calibrating to obtain control action at the desired temperature. Any equivalent device may be used.

The function of the switching device 8 is to stop operation of the fan when the furnace temperature falls so low that the fan would be ineffective for any useful purpose, or so low that, in winter time, cold air would be forced into the room. The thermostatic element 8 controls a mercury switch 16 (see Figures 2 and 3) which controls the circuit to the fan motor 5. The tube 16 is mounted on a support 10ª adjustably attached to a support 10ᵇ as by pivot 10ᶜ, the support being attached to a rod 10ᵈ as by set screw 10ᵉ, and the rod being controlled by thermostatic bimetallic element 10. By angular adjustment, the desired action can be obtained. It may be set in closed position and the temperature at which it responds may be varied. Any equivalent switch may be employed. A damper control device is generally indicated at 17 and is diagrammatically shown. Any equivalent means can be used for operating the combustion rate-varying means. The motor rotor 18 drives reduction gearing 19 through shaft 20 and the reduction gearing, in turn, drives a shaft 21 which controls brush 22, cooperating with tracks of a circular program switch. The brush, in this instance, moves in clockwise direction and is adapted to successively contact track segments 23, 25, 24 and 26. The short track segments or buttons 23—24 and the segments 25—26 are so related that electrical contact is continuously maintained as the brush travels from one segment to another. Shaft 21 has a gear 27 meshing with gear 28 on shaft 29, and shaft 29 has a gear 30 meshing with gear 31 on shaft 32. Shaft 32 is provided with arms 33—34 which are connected respectively with dampers 2 and 3 by means of cables 35—36 guided over suitable pulleys. This motor may be considered as part of means for varying the combustion rate of the furnace.

A room thermostat is generally indicated at 37 and is, in this instance, of the double-contact type. It is provided with the usual thermostatic bi-metallic blade 38 alternatively cooperable with a "cold" contact 39 and "hot" contact 40. This thermostatic switch, like the limit control 7 and the device 8, is preferably of standard type. Ordinarily, means is provided for adjusting the thermostat to respond to any desired differential in room temperature.

In this embodiment of the invention, the thermostat controls a relay, as a convenient means for concurrently, or cooperatively, controlling operation of the fan and draft motors. The room thermostat controls the relay through a circuit which includes therein a triple pole double-throw switch, generally indicated at 42. The arrangement and function of this switch constitutes a valuable feature of the present invention, by which the effective action of the thermostat can be reversed. The relay unit may be viewed as comprising a transformer having a high voltage winding 43 connected across line wires 44—45 by conductors 46—47. The low voltage winding of the transformer is indicated at 48. The relay has a pull coil 49 and a bucking or neutralizing coil 50 which coils cooperate to control armature 51 connected to switch arms 52—53—54 and 55, respectively controlling contacts 56, 57, 58 and 59—60. The switches are normally positioned as shown in the drawings and moved to this position by gravity. Contacts 56, 57, 58 and 60 are simultaneously closed on energization of the pull coil 49. The switch arm 55 engages contact 59 when the pull coil is deenergized, but on energization of the pull coil, arm 55 leaves contact 59 and engages contact 60.

The wiring connections between the thermostat 37, relay unit 41, limit control 7, damper motor 17, and the fan motor control device are only referred to in detail under the headings "Cold weather operation", "Warm weather operation". It will be understood that on a call for heat by the room thermostat closing contact 39, the dampers are moved to such position as to increase heat production at the furnace, and thereafter when the furnace has reached the proper temperature the motor fan circuit is closed and the fan started.

The motor for the damper control device 17 is of the type which has its field winding 61 continuously in circuit with the power lines 44—45 and with the primary 62 of a choke transformer, the secondary of which is indicated at 64. The choke transformer is so designed that sufficient current will not flow through the primary 62 (and consequently through the field winding 61) unless secondary 64 is short-circuited. This general type of choke transformer circuit in combination with a motor is shown in Shivers Patent No. 1,664,325.

*Cold weather operation*

In the diagram, Figure 1, the parts are positioned as during cooling of the room, at which time the thermostatic blade 38 is moving toward the cold contact 39. The dampers are closed and the furnace is at such a lower temperature that thermostat 10 is maintaining switch 16 in open position. Also, the temperature is sufficiently lowered at the furnace so that arm 12 is engaging contact 15. The reversing switch 42 is presumably at the upper or "winter-control" position, although for convenience it is shown nearer its lower or summer time position. Assume contact 39 to close, the pull coil is energized through the following circuit: one side of the secondary 48, conductor 65, pull coil 49, 66, reversing switch 42, 67 contact 39, switch blade 38, 68, reversing switch 42, 69 to opposite side of the secondary 48. Energization of the pull coil results in closure of contacts 56, 57, 58 and 60. Closure of contact 57 establishes a holding circuit for the pull coil as follows: secondary 48, 65, coil 49, 66, 70, contact 57, switch arm 53, 71, 69 to opposite side of secondary 48. Closure of contact 58 conditions the fan motor circuit for energization on closure of switch 16, due to a sufficient temperature at the furnace. Closure of contact 56 conditions the circuit for the neutralizing coil 50 for energization when element 38 engages the "hot" contact 40 of the room thermostat, on a call for less heat. Closure of contact 60 energizes the damper motor, to move the dampers to their heat-increasing position, through the following circuit: secondary 64 of the choke transformer, 72, brush 22, track segment 23, 73, contact 15, switch arm 12, 74, 69, switch arm 55, 75, 76, 77, 78, segment 25, 79 to opposite side of secondary 64. Short circuiting of secondary 64 allows more current to flow through primary 62 and field winding 61, resulting in rotation of rotor 18 to shift the dampers to open position while rotating the brush in clockwise direction. The segment 25 constitutes part of the holding circuit for maintaining a short-circuited condition of the coil 64 until the dampers have been moved to their heat-increasing or open position. This circuit, once made, is maintained whether contact 60 remains closed or not. The maintaining circuit is as follows: secondary 64, 72, brush 22, track 25, conductor 79 back to secondary 64. When the brush passes to track segment 24, secondary 64 is open-circuited, the motor stops and the dampers remain in their heat-increasing position.

Furnace temperature now rises and when the temperature is sufficient, switch 16 is closed, starting the fan motor. The circuit for the fan is as follows: 44, 80, contact 58, arm 54, 81, motor 5, 82, switch 16, 83 to line 45. If, as the result of operation of the fan, the temperature at the furnace should be sufficiently lowered, mercury switch 16 will open and de-energize the fan motor. Thus the fan is stopped, if its continued operation would result in delivering cold air to the room.

Assuming a continued and sufficient rise in furnace temperature to the upper limit for which the limit control 7 is set, arm 12 will leave contact 15 and arm 11 will engage contact 14 to again short-circuit the secondary 64. The circuit is as follows: 64, 72, 22, 24, 84, 85, switch arm 11, contact 14, 86, 76, 77, 78, track 25, 79 to 64. As the result of this short circuit, more current again flows through primary 62, field winding 61 is operatively energized and the dampers are moved to the heat-decreasing position during the travel of the brush from track segment 24, over 26 to 23. Track segment 26 is part of the circuit for maintaining energization of coil 64 while the dampers are moved to heat-decreasing position. This circuit is as follows: secondary 64, 72, brush 22, track 26, 78, track 25, 79 to secondary 64. The maintenance of the short circuit for the secondary insures motor operation until dampers have moved to the damper-open position. It will be noted that although the operation just mentioned has resulted from a rise in furnace temperature sufficient to move the limit control to close contact 14, the fan switch 16 is still closed so that the fan is still operating.

With the drafts in heat-decreasing position, and with the fan operating, the temperature of the furnace air will fall, since air is being delivered to the room. When the temperature falls sufficiently, switch arm 11 opens contact 14, and switch arm 12 closes contact 15 to again short-circuit the secondary 64 and cause the drafts to move to heat-increasing position.

Therefore, on a call for heat by the room thermostat, the dampers are moved to a position to increase heat production and after sufficient furnace temperature rise, the fan is started. If the temperature of the air in the furnace is sufficiently lowered, switch 16 opens and stops the fan. If, at any time, furnace temperature becomes excessive, limit control 7 will operate the dampers to decrease heat out-put of the furnace, but the fan will continue operating as long as the room thermostat is calling for heat, if the furnace temperature does not fall below a certain predetermined low limit. If the temperature of the furnace falls below this limit, while the room thermostat is calling for heat and because the dampers have been moved to a position to decrease heat out-put then they will be automatically moved by action of the limit switch 7 to obtain increased heat out-put. Thus the fan is shut down whenever the temperature of the air in the furnace is too low, the drafts are closed whenever the temperature of this air is too high, and they will remain closed as long as the room thermostat does not become sufficiently warm to close the contact 40. As previously explained, the settings of the fan switch 8 and the limit control 7 may be so adjusted that they will operate at any desired temperature differential, that is so that any desired interval may be had between the starting of the fan and the closing of drafts, due to excessive temperatures in the furnace.

When the room becomes sufficiently heated, contact 40 of the room thermostat is closed and circuit for the neutralizing coil 50 is established as follows: secondary 48, 65, 87, contact 56, switch arm 52, 88, neutralizing coil 50, 89, reversing switch 42, 90, hot contact 40, blade 38, 68, reversing switch 42, conductor 69 to opposite side of secondary 48. The magnetic effects now produced in coil 50 neutralize or annul the magnetic effect of pull coil 49 causing the armature 51 to move by gravity to the open position shown in the drawings. The result is that contacts 56, 67, 58 and 60 are opened, and contact 59 is closed. The relay is now conditioned for energization on another call for heat and closure of contact 39. Opening of contact 58 de-energizes fan motor. Closure of contact 59 short-circuits the secondary 64 (brush 22 at this time resting on segment 24). The circuit is as follows: secondary 64, 72, brush 22, track section 24, 84, 91, contact 59, arm 55, 75, 76, 77, 78, track 25, 79, secondary 64. This short-circuiting will cause dampers to be moved to heat-decreasing position and at the end of this operation, the brush 22 will be resting on segment 23 and the system will again be in the position shown in the drawings.

*Warm weather operation*

When it is desired, during the warm weather or summer season, to utilize the draft fan for drawing cold air from the basement to cool the rooms, the reversing switch 42 is moved to the lower position, near which it is shown in the drawings. The switch 16 is now adjustably rocked to closed position, where it will remain during the warm weather season. Under this condition, when the element 38 engages contact 40 indicating that the room is too warm, pull coil 49 is energized through the following circuit: secondary 48, 69, 92, reversing switch 42, 68, blade 38, contact 40, 92, reversing switch 42, 93, 66, coil 49, 65, opposite side of secondary 48. Contact 58 is closed as result of energization of the relay coil. Contact 58 is closed and the fan is started. By this operation, the dampers will be also moved to a position which, if there was a fire in the furnace, would result in increased heat out-put.

In case a fuel control valve is substituted as means for increasing heat out-put, it may be advisable to use a manually operable switch to prevent operation of the valve during the summer time. This may even be desirable when a damper motor is employed.

If the operation of the fan cools the room sufficiently to cause element 38 to make with element 39, the neutralizing coil 50 is energized as follows: secondary 48, 65, 87, contact 56, 52, 88, 50, 89, 94, reversing switch 42, 67, 39, 38, 68, 42, 92, 69 to 48. Relay will now open and fan motor will be de-energized by opening of contact 58.

If it is not desired to have the fan operate whenever the room temperature is above normal, say 72 degrees, the thermostat may be adjusted so that element 38 will not engage the hot contact 40 until the temperature rises to a point higher than is ever attained during the warm weather period. Then when it is desired to have the fan operate, the thermostat-adjusting mechanism (not shown) may be returned to its normal or lower setting. Thus during the warmer period, the usual thermostat-adjusting mechanism may be utilized as a convenient manually-operable switch for controlling the fan for cooling and ventilating purposes.

Although a mercury switch 16 has been shown, and open contact type of switches have been shown for all the other devices, it is to be understood that there is no intention to be limited in regard to the character of the switches employed.

A broad feature is the provision of a control system in which both the means for producing forced circulation and the means for increasing and decreasing the heat are automatically and dominantly controlled by a single room thermostat of a standard construction, and in which, in warm weather, the action phase of the thermostat can be reversed for controlling the fan as an air circulating means.

I claim as my invention:

1. A system of the class described, comprising in combination, a hot air furnace, a fan for forcing the air heated thereby into the space to be heated, a thermostat responsive to the temperature of the circulating air in the furnace and means by which it prevents operation of the fan when said air is at a temperature below the setting of said thermostat adjustable means associated with said thermostat to permit operation of the fan regardless of furnace temperature, a heat increasing means for the furnace, a thermostat in the space to be heated and in control of said means, and mechanism associated with the second thermostat and fan, whereby the fan may be operated automatically by the second thermostat when the space to be heated becomes too warm.

2. A system of the class described, comprising a hot air furnace, an electrically operated fan for circulating the air heated thereby, a double contact room thermostat, electrically controlled heat increasing means for the furnace, a relay through which the thermostat controls operation of the fan and heat increasing means and, a thermostatic switch responsive to the temperature of the circulating air for preventing operation of the fan when the air is below a predetermined minimum temperature.

3. A system of the class described, comprising a hot air furnace, an electrically operated high voltage fan for circulating the air heated thereby, an electrically operated heat increasing means, a low voltage room thermostat in control of the heat increasing means and fan through a relay mechanism, a thermostatic switch responsive to the temperature of the circulated air for preventing operation of the fan when the temperature of said air is below a predetermined minimum, and means for reversing the automatic operation of the fan in the summer whereby unheated air in the furnace is circulated to the room when the room is hot.

4. A system of the class described, comprising a hot air furnace, a fan for circulating the air heated thereby, a high voltage motor for operating said fan, a low voltage damper motor for operating the drafts of said furnace, a low voltage room thermostat controlling the damper motor, a relay controlled by the room thermostat, high voltage contacts operated by the relay and controlling the flow of power to the fan motor, a high voltage fan switch responsive to the temperature of the circulated air for preventing operation of the fan motor when the temperature of the air is below a predetermined minimum, and a low voltage limit control switch for closing the drafts if the temperature of the air becomes excessive.

5. In a control system for hot air furnaces, a room thermostat, electrically controllable means for producing a forced circulation of air in the air delivery line of the furnace, means by which the room thermostat controls the forced circulation producing means, means by which the action phase of the thermostat on the last mentioned means can be reversed, means controlled by the room-thermostat-controlled means for heating the furnace coordinately with operation of the forced-circulation-producing means, and thermostatic means which prevent action of said forced-circulation-producing means if the furnace is below a predetermined temperature including means adjustable to permit operation of said forced-circulation-producing means independently of temperature conditions.

6. In a control system for hot air furnaces, a room thermostat, electrically controllable means for producing a forced circulation of air in the air delivery line of the furnace, means by which the room thermostat controls the forced-circulation-producing means, means by which the action phase of the thermostat on the last mentioned means can be reversed, means controlled by the room-thermostat-controlled means for operating the drafts of the furnace coordinately with the forced-circulation-producing means, and thermostatic means which prevents action of said forced-circulation-producing means if the furnace is below a predetermined temperature, including means adjustable to permit operation of said forced circulation producing means independently of the temperature conditions.

7. In a device of the class described, an air conduit, a thermostat responsive to the temperature of air as delivered from the conduit, electrically controllable means for forcing circulation of air in the conduit, means by which the circulation-forcing means is controlled in response to the temperature of air in the conduit, means by which the circulation-forcing controlling means can be set so that temperature variations will not change the operative condition of said circulation-forcing means, means by which the thermostat controls said circulation-forcing means, and means by which the action phase of the thermostat on said last mentioned means can be alternately reversed.

8. In a control system for hot air furnaces, a room thermostat, electrically controllable means for producing forced circulation of air in the air delivery line of the furnace, means by which the room thermostat controls the forced circulation-producing means, means by which the action phase of the thermostat on the last mentioned means can be alternately reversed, thermostatic means which prevents action of said forced circulation-producing means if the furnace is below a predetermined temperature, and adjustable means by which action of said thermostatic means is rendered effective or ineffective to change the operative condition of the circulation-forcing means.

9. In a control system for hot air furnaces, a room thermostat, electrically controllable means for producing the forced circulation of air in the air delivery line of the furnace, means by which the room thermostat controls the forced-circulation-producing means, means by which the action phase of the thermostat on the last mentioned means can be reversed, means controlled by the room-thermostat-controlled means for operating the drafts of the furnace coordinately with the forced-circulation-producing means, thermostatic means which prevents action of said forced-circulation-producing means if the furnace is below a predetermined temperature, and thermostatic means which prevents operation of the drafts to increase heat production if the furnace is above a predetermined temperature, without affecting operation of the forced circulation producing means.

10. A system of the class described comprising a hot air furnace, means for forcing the circulation of air heated by the furnace, means for controlling said circulation-forcing means including a thermostatically operable switch responsive to air temperature in the furnace, adjustable means by which the switch can be held closed notwithstanding thermostatic action, means for varying the rate of combustion in the furnace, a thermostat responsive to air temperature at the point of air delivery, means by which said thermostat controls said circulation-forcing and combustion-varying means to cause the latter to increase combustion, and operate the former to force circulation when a predetermined high temperature at the furnace is reached, and vice versa, including electrical connections and a switch capable of reversing the connections so that the thermostat can obtain either forced-circulation when sufficiently cold or forced-circulation when sufficiently hot.

11. A system of the class described, comprising a hot air furnace, electrically operable means for forcing circulation of air heated by the furnace, means for controlling said circulation-forcing means in response to air temperatures at the furnace, electrically operable means for varying the rate of combustion in the furnace, a relay and electrical connections by which it cooperatively controls said circulation-forcing means and combustion-rate-varying means, a thermostat responsive to air temperature at point of delivery, electrical control connections between the thermostat and relay and a switch for controlling said connections to alternatively change the relation thereof respectively to obtain energization of the relay either on a call for heat or on a call for less heat.

12. A system of the class described, comprising in combination, a hot air furnace, an electrically operated fan for circulating the air heated by the furnace, a thermostat responsive to the temperature of the space to be heated, electro-magnetic means, switching mechanism controlled thereby, hot and cold circuits controlled by the thermostat, two position manually operable circuit reversing means, connections between said hot and cold circuits, manually operable circuit reversing means and electro-magnetic means whereby said switching mechanism will be moved to a first position upon closure of said cold circuit and to a second position upon closure of said hot circuit when the manually operable circuit reversing means is in one position and whereby said switching mechanism will be moved to its second position upon closure of the cold circuit and to its first position upon closure of the hot circuit when the manually operable circuit reversing means is in its other position, electrically controlled heat increasing means for the furnace, thermostatic mechanism responsive to the temperature of the air heated by the furnace, and connections between the fan, heat increasing means, thermostatic mechanism and switching mechanism whereby said heat increasing means is operated when the temperature of the heated air is below a predetermined maximum and the fan is operated when the temperature of the air is above a predetermined minimum while the switching mechanism is in its first position, and whereby operation of both the fan and the heat increasing means is prevented when said switching mechanism is in its second position.

13. In a device of the class described the combination of plural means for controlling the rate of combustion of a heat-producing apparatus and the rate of supply of a heat-conducting medium heated by said apparatus, a relay, electrical connections by which the relay separately controls each of said means, a room thermostat for controlling the relay, the electrical connections for the relay controlled combustion rate-controlling means including therein a thermally controlled double contact limit switch responsive to furnace temperature, and said relay including a contact for so controlling circuits to said limit switch that when the relay is in open position a circuit through one contact is obtainable and when the relay is in closed position a circuit through the other contact is obtainable.

14. A control system for use with the motor of a damper mechanism, and with the motor of the furnace fan of a heater including a room thermostat controlling a relay, and separate circuits for the fan and damper motor separately controlled by the relay, and means by which the action phase of the thermostat on the relay can be reversed.

15. A system of the class described, comprising, in combination, a heater, an electrically operated circulator for circulating a heating medium in contact with said heater, a double circuit thermostat adapted to close separate circuits upon fall and rise in the temperature to which it responds, electrically controlled means for controlling the operation of said heater, a relay through which the thermostat controls operation of the circulator and heater-controlling means to operate the same when the temperature to which said thermostat responds falls to a predetermined degree, and thermostatic switching means responsive to the temperature of the circulated heating medium for preventing operation of the circulator to circulate said heating medium when the circulated heating medium is below a predetermined minimum temperature and for preventing operation of the heater-controlling means to supply maximum heat to the heater when the circulated heating medium is above a predetermined temperature higher than said minimum temperature.

16. A system of the class described, comprising, in combination, a heater, a circulator for circulating a fluid medium in contact with said heater, a high voltage motor for operating said circulator, a low voltage device for controlling the heat output of the heater, a low voltage thermostat controlling said device, a relay controlled by the thermostat, high voltage contacts operated by the relay and controlling the flow of power to the circulator motor, a high voltage circulator switch responsive to the temperature of the fluid medium for preventing operation of the circulator motor when the temperature of the fluid medium is below a predetermined minimum, and a low voltage limit control switch for controlling said device to reduce the heat output of the heater if the temperature of the fluid medium becomes excessive.

17. In a heater control system, a heater, a main control switch, an electrically operated circulator for circulating a fluid medium in contact with said heater, means by which the main control switch controls the circulator, means by which the action phase of the main control switch on the last mentioned means can be reversed, means controlled by the main-control switch-controlled means for varying the heat output of said heater coordinately with the circulator, thermostatically controlled means which prevents action of said circulator if the heater is below a predetermined temperature, and thermostatically controlled means which prevents operation of the heater output-varying means to increase the heater output if the heater is above a predetermined temperature, without effecting operation of the circulator.

18. A system of the class described, comprising, in combination, a hot air furnace, an electrically operable fan for circulating the air heated thereby, a double contact room thermostat including hot and cold contacts, electrically controlled heat increasing means for the furnace, a double circuit relay through which the thermostat controls operation of the fan and heat increasing means, a thermostatic switch responsive to the temperature of the circulated air for preventing operation of the fan when the air is below a predetermined minimum temperature including means adjustable to permit operation of said fan independently of temperature conditions, and a double circuit reversing switching mechanism associated with said room thermostat and relay by which the action of said room thermostat upon said relay may be reversed.

DANIEL G. TAYLOR.